(12) United States Patent
Lin

(10) Patent No.: US 8,126,290 B2
(45) Date of Patent: Feb. 28, 2012

(54) METHOD, APPARATUS AND SYSTEM FOR COLOR COMPONENT REGISTRATION

(75) Inventor: Shu Lin, Santa Clarita, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 877 days.

(21) Appl. No.: 12/086,459

(22) PCT Filed: Dec. 16, 2005

(86) PCT No.: PCT/US2005/045437
§ 371 (c)(1),
(2), (4) Date: Jun. 12, 2008

(87) PCT Pub. No.: WO2007/070051
PCT Pub. Date: Jun. 21, 2007

(65) Prior Publication Data
US 2009/0046925 A1 Feb. 19, 2009

(51) Int. Cl.
*G06K 9/32* (2006.01)
(52) U.S. Cl. .................................... 382/294
(58) Field of Classification Search .................. 382/162
See application file for complete search history.

(56) References Cited

U.S. PATENT DOCUMENTS

| 4,641,244 | A | 2/1987 | Wilson et al. |
| 6,549,576 | B1 | 4/2003 | Moriyoshi |
| 7,092,584 | B2 | 8/2006 | Perlmutter et al. |
| 2002/0141626 | A1* | 10/2002 | Caspi ............................ 382/131 |
| 2003/0063788 | A1* | 4/2003 | Boland et al. |
| 2003/0128280 | A1* | 7/2003 | Perlmutter et al. ......... 348/222.1 |
| 2005/0213807 | A1* | 9/2005 | Wasserman ................... 382/152 |
| 2008/0317354 | A1* | 12/2008 | Shiratani ....................... 382/195 |
| 2010/0158342 | A1* | 6/2010 | Iizuka .......................... 382/134 |

FOREIGN PATENT DOCUMENTS

EP 0659022 * 6/1995
(Continued)

OTHER PUBLICATIONS

Saito, T. et al.: "Image Processing for Restoration of Old Film Sequences," Image Analysis and Processing, 1999 Proceedings International Conference in Venice, Italy, Sep. 27-29, 1999, IEEE Comput. Soc., US, pp. 709-714, XP010354245.
Bonello, A.: "Digital Reregistration of Separations to Form Color Images," Proceedings of the JTS, 2004, 9 pages, XP002405069.

(Continued)

*Primary Examiner* — Brian Werner
*Assistant Examiner* — Nirav G Patel
(74) *Attorney, Agent, or Firm* — Robert D. Shedd; Robert B. Levy; Jorge Tony Villabon

(57) ABSTRACT

A method, apparatus and system for image processing include a registration device configured to register component images for at least a block of an image to form a registered image. A quality control device is configured to receive the registered image, examine the registered image, and modify portions of the registered image to improve the alignment of the registered image. In one embodiment of the present invention, the quality control device includes user controls to perform quality control functions including communicating a command to the registration device to re-register an image modified by the quality control device. The user controls may include a control panel configured specifically for making the quality improvement changes required.

8 Claims, 5 Drawing Sheets

FOREIGN PATENT DOCUMENTS

| | | | |
|---|---|---|---|
| GB | 2360895 | * | 10/2001 |
| JP | 61-231557 | | 10/1986 |
| JP | 63-182961 | | 7/1988 |
| JP | 2-501417 | | 5/1990 |
| JP | 2000-236552 | | 8/2000 |
| JP | 2005-515527 | | 5/2005 |
| WO | WO 89/03051 | | 4/1989 |
| WO | WO2006080950 | * | 8/2006 |
| WO | WO2006080953 | * | 8/2006 |

OTHER PUBLICATIONS

Medioni, G. et al.: "Automatic Registration of Color Separation Films," Proceedings of the International Conference on Robotics and Automation, Cincinnati, May 13-18, 1990, IEEE Comp. Soc. Press, US, vol. 3, pp. 1495-1502, XP000143769.

International Search Report, dated Nov. 13, 2006.

Patent Abstract of Japan, JP 63-182961, published Jul. 28, 1988, Agency of Ind Science & Technol, S. Yoshihiro et al.

* cited by examiner

METHOD, APPARATUS AND SYSTEM FOR COLOR COMPONENT REGISTRATION

This application claims the benefit, under 35U.S.C. §365 of International Application PCT/US2005/045437 filed Dec. 16, 2005, which was published in accordance with PCT Article 21(2) on Jun. 21, 2007 in English.

FIELD OF THE INVENTION

The present invention generally relates to image editing tools and methods and, more particularly, to a graphical user interface tool, system and method, which provide the ability to register component color images.

BACKGROUND OF THE INVENTION

In industries that provide visual images, such as the film industry, photography, videos, etc., images are often post processed and enhanced. Post processing may include a number of procedures that alter the original state of the image or film. In post processing, it is often useful to break images up into constituent sub-images. The constituent sub-images may include, for example, color components or strips. This may include three-strip processing, such as Yellow, Cyan and Magenta (YCM) processing.

To store a film for a long time and reduce the color fading speed, a color film is separated into three-color components, Cyan, Magenta, and Yellow. Each color component is stored on a reel. A color film is stored in three separate mono color reels. When the time comes to re-release the film, or some other application, the three-color components need to be recombined. With time, the film geometrically shrinks or distorts. The shrinking is different in different portions of the reel and certainly different from reel to reel. These three components need to be registered to get a correct color film at least because the distortion is not linear over a print. Such distortion makes the registration difficult.

The three mono color strips need to be recombined by registering or aligning the colored component images. Quality control (QC) is needed to make adjustments and corrections on the registered image. However, the QC task is very difficult or even impossible since three component images may have significant non-linear distortions and they are rarely re-matched by hand. An automatic three-strip registration can make the processing much easier, but currently cannot be guaranteed to be consistently aligned properly. A QC is required for the final check, and correct any mismatched edges.

Because the nature of the YCM registration, a need exists for providing an improved registration system and method that permits easy and efficient quality checking.

SUMMARY OF THE INVENTION

In one embodiment of the present invention, a system, method and apparatus for image processing include a registration device configured to register component images for at least a block of an image to form a registered image. A quality control device is configured to receive the registered image, check the registered image and modify portions of the registered image to improve alignment and/or enhance the registered image. The quality control device includes user controls to perform quality control functions including a command to the registration device to re-register an image modified by the quality control device. The user controls may include a control panel designed specifically for making the quality improvement changes required.

In an alternate embodiment of the present invention a control panel for image registration includes a display screen configured to display at least an entire image, color components of the image and/or blocks of the image thereon. A selection means is configured to enable a selection of at least one of the image, color components of the image and/or blocks of the image. User controls are provided to enable manipulation of at least one of the image, color components of the image and/or blocks of the image for making adjustments to the registration.

In yet an alternate embodiment of the present invention, a method for image registration using a control panel includes providing registered color components for an image, dividing each color component into blocks in accordance with parameters, determining blocks with overlap and no-overlap with other blocks, recombining the blocks and the color components to check registration between the color components and blocks using a control panel, modifying the blocks to improve registration, and reregistering at least one block in accordance with the step of modifying.

BRIEF DESCRIPTION OF THE DRAWINGS

The teachings of the present invention can be readily understood by considering the following detailed description in conjunction with the accompanying drawings, in which.

Figure 1:
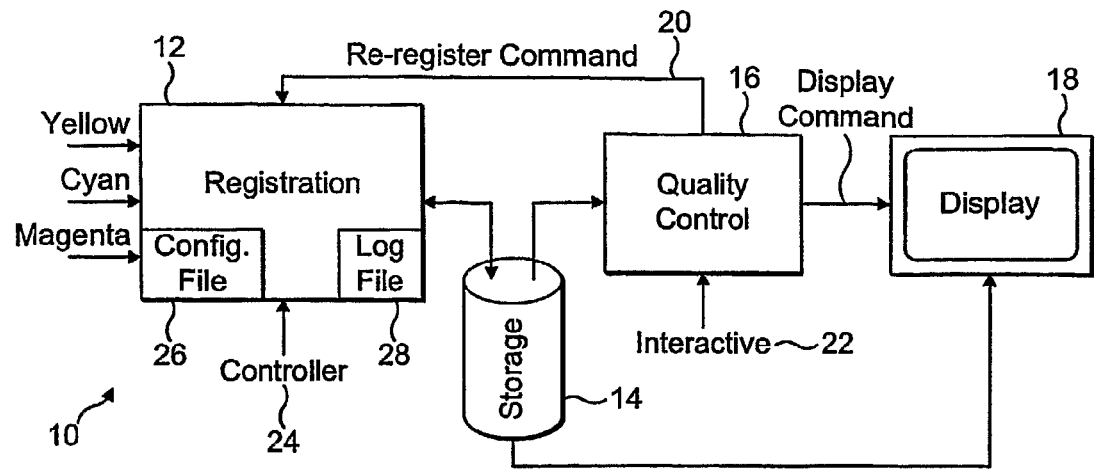
FIG. 1 depicts a high level block diagram of a registration and quality control system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides an apparatus, system and method for registering color components (strips) for an image or film. Although the present invention will be described primarily within the context of a video processing/editing system, the specific embodiments of the present invention should not be treated as limiting the scope of the invention. It will be appreciated by those skilled in the art and informed by the teachings of the present invention that the concepts of the present invention can be advantageously applied in any system, which is capable of processing images. In addition, the concepts of the present invention can be advantageously applied in any editing method including editing methods for film, DVDs, photographs, etc.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

FIG. 1 depicts a high level block diagram of a registration and quality control system 10 in accordance with an embodiment of the present invention. Although in the registration and quality control system 10 of FIG. 1, yellow, cyan and magenta (YCM) registration will be illustratively described, other image registration techniques and color components (e.g., red, green, blue (RGB)) may also be employed and benefit from the teachings of the present invention. In the registration and quality control system 10 of FIG. 1, YCM automatic registration can be performed by a register 12. YCM registration is used for film post-production and film restoration, for example. A Quality Check (or control) (QC) 16 uses, for example, a Graphical User Interface (GUI) 22 for YCM registration. However other image registration techniques may also be employed and benefit from the teachings of the present invention.

The GUI 22 is employed for fine tuning or making corrections in the registered image. The registered image can be stored in a memory storage device 14. The memory storage 14 can include any known memory device and media, such as a hard drive, CD, floppy disk, etc. The memory storage 14 can however be bypassed and the output of the register 12 may be communicated directly to the quality checker 16.

In accordance with a preferred embodiment, the GUI 22 through a display device 18 and interactive controls of the GUI 22 enables the QC 16 to move blocks of a registered image one by one. Each time a block is processed, the image may be re-registered using a re-register command 20, which sends the image to the register 12. Re-registration may be performed after moving, modifying or adjusting one block, multiple blocks or the image as a whole. The result may be simultaneously displayed on the display 18 during the QC process, and the QC can make a judgment based on changes to the block rather than the whole image, although whole image registration may be performed as well.

In one embodiment of the present invention, an image is broken down into the three color components, yellow, cyan and magenta, and communicated to the register 12. The color components may be scanned versions of an original film and include shrinkage and distorted images. Some parameters are set by a controller 24 which may include post processing image controls. For example, enhancements, adding features, altering or deleting color components, changing shapes of objects, aligning the color components, reformatting the image, adjusting overlaps for blocks, determining block sizes, removing imperfections or any other controls can be performed by the controller 24. The registered images can be stored in the storage device 14 and can be displayed on the display device 18 in real-time and/or after operation on the image by the QC 16. The quality checker 16 examines the image, and can reject or accept the image based upon a comparison to the original image or based on predetermined criteria. The predetermined criteria can include information regarding the misalignment of the color components, improper coloration of objects, or any other criteria needed to produce a given image.

If the image is rejected by the QC 16, some parameters can be modified by the QC 16 or by the register 12 depending on the modification needed. If the modification needed is due to misalignment then the image is modified by the QC 16 and is returned to the register 12 along with the modification parameters to properly align the image. The re-register command 20 is sent to the register 12, and the picture will be registered again. This process can be repeated until the image is accepted by the QC 12.

The YCM register 12 of the system 10 of FIG. 1 has a configure file 26, and generates a log file 28 that includes all of the information for the registration. The information in the configure file 26 and the log file 28 can be re-used to register the YCM files without re-computing all parameters. The QC 16 can also modify some of the parameters as well. The QC 16 can include automatic controls or can alternatively include manual controls, wherein a human operator with their experience can improve the registration of an image.

Some of the parameters that can be manipulated by the QC 16 in the registration process include: 1. Adjust/determine a number of blocks in horizontal direction, 2. Adjust/determine number of blocks in vertical directions, 3. Block overlap indication, 4. Best matched vectors of a block (best block location), 5. Color component indicator, 6. Search range, and the like.

Depending on the severity of distortion, a picture may need to be divided into blocks. If the non-linearity of distortion cannot be ignored, a picture may be divided into a specific number of blocks. A block can have some overlap with its adjacent blocks or can alternatively have no overlapping portions. The number of blocks can be determined by the contents of the picture. The number of blocks can be very rough however, higher accuracy requires more blocks. That is, more blocks require smaller block size, and the smaller block size can result in some registration difficulty. For example, in one embodiment of the present invention, the number of blocks for 2K materials can be, e.g., 1×1, 2×2, 2×4, 4×4, 4×6, or 4×8, etc. However, more than 8 blocks in either dimension are not typically needed.

To register three color components, correlations between the components need to be found. There are several ways to calculate the correlations. Edge correlation or edge matching is an example where edge detection and edge matching are employed. Any existing edge detection techniques can be used, for example, Canny edge detection. The matching is implemented after the edges are obtained. Any of the three color components can be chosen as a base, and displacements of the other two color components can be calculated from the chosen base.

In accordance with one embodiment of the present invention, there are two displacement vectors determined for each block, $(V^x_{rg}, V^y_{rg})$, $(V^x_{rb}, V^y_{rb})$, where $V^x_{rg}$ is a displacement between red and green in the x direction, and $V^y_{rg}$ is a displacement between red and green in the in y direction, while $V^x_{rb}$ is a displacement between red and blue in the x direction and $V^y_{rb}$ is a displacement between red and blue in the y direction. In the example above, it is assumed that the red component is used for the base. Note that the colors, red, green and blue, are illustrative to designate three color components for illustrative purposes only and that other colors may be implemented in accordance with the concepts of the present invention.

If a picture is divided into blocks, then all the data should be processed to eliminate large errors and to make the values of the displacements change/transition smoothly across the picture. For example, a one-dimensional third-order curve in either the x or y direction can be used, or a two-dimensional third-order plane may be employed. Certainly, lower order or higher order curves or planes can be used. In the present invention, the adjusted parameters are used to calculate six parameters of an affine transform. Four vectors may be used to calculate the affine transform of each block. Here redundancy is used to reduce errors. It is then used to find a pixel in a new picture at its corresponding location in the old picture, and get the pixel value by interpolating. The new picture is saved in a file, such as dpx, yuv, raw, or ppm. The vector comparison using an affine transform can be employed to check alignment; however, other mathematical transforms and vectors may also be employed to characterize the positions of the blocks and to compare these positions.

A picture can be divided into blocks first and then edge detection can be implemented, or alternatively, edges can be detected first and then the edge picture divided into blocks. The outputs can, however be different. In the present invention, two parameters can be used to divide the picture; the number of blocks in horizontal direction, and the number of blocks in vertical direction. The blocks can be overlap or non-overlap blocks. In addition, the portion of overlap can vary. Furthermore, the block size can be different from one block to another. If the block size is varying, the size is determined by the contents of the picture. For example, the rich texture areas can have small blocks, and the less texture areas can have large blocks.

Figure 2:
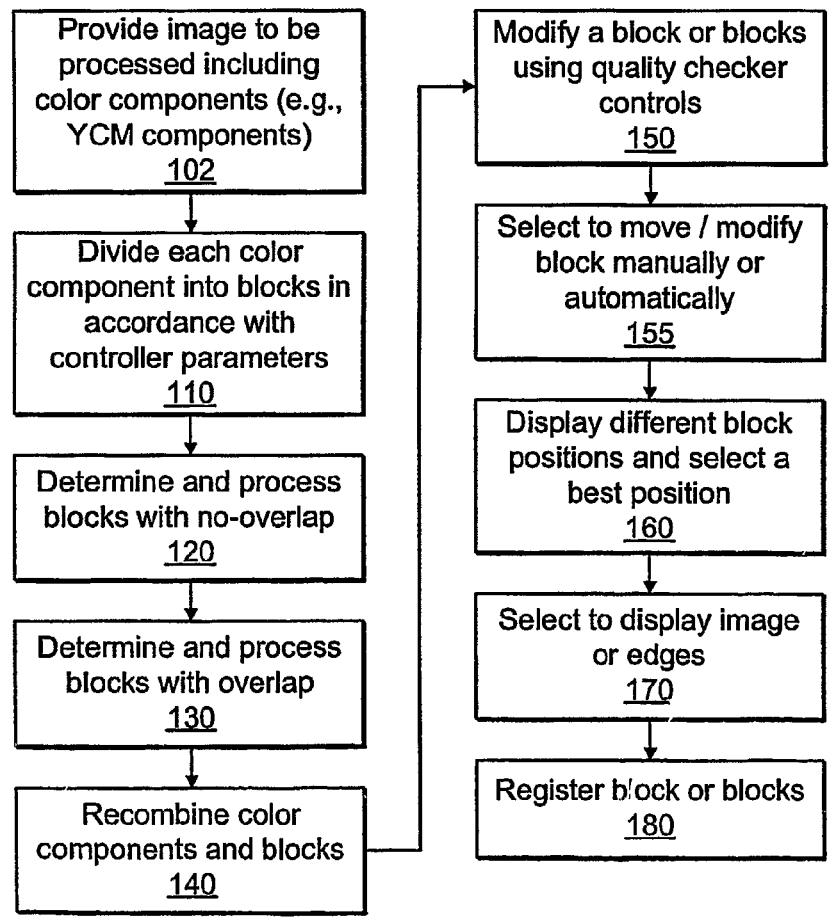
FIG. 2 depicts a flow diagram of a method for providing registration in accordance with an embodiment of the present invention.
Figure 3:
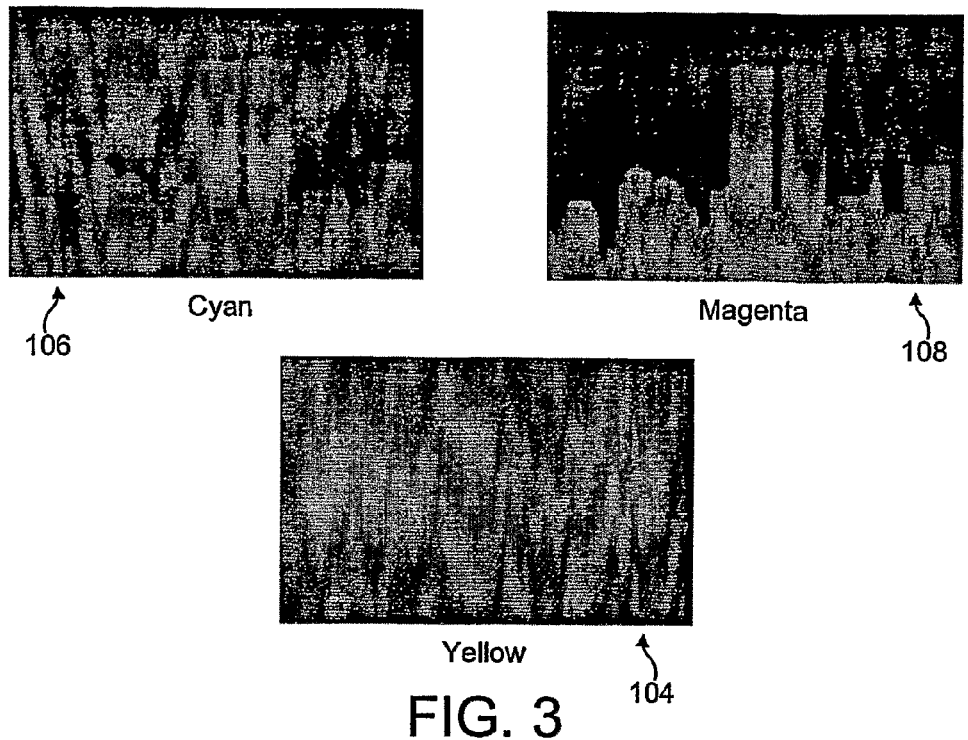
FIG. 3 depicts a diagram illustrating three color component images for a composite image in accordance with an embodiment of the present invention.

FIG. 2 depicts a flow diagram of a method for providing registration in accordance with an embodiment of the present invention. The method of FIG. 2 begins in step 102 where an image to be processed is provided. The image may be a finished image that needs to be restored, or an image that needs to be post-processed, for example. The image can be provided with its color components separated, where constituent components (sub images) of the image are provided. For example, FIG. 3 depicts a diagram illustrating three color component images for a composite image in accordance with an embodiment of the present invention. In FIG. 3, a yellow component 104, a cyan component 106 and a magenta component 108 are provided. For the method of FIG. 2, it is preferable that the image be initially registered to permit checking of the initial registration. The color components preferably include digitally rendered images of the components.

Referring back to FIG. 2, in step 110, each of the three components is divided into blocks. These blocks can be sized and overlapped in accordance with a controller input 24 to the register 12 (FIG. 1). The controller input 24 provides parameters to decide the sizes, overlap and numbers of blocks based on the accuracy and resolution of the images and their content. Blocks can be considered for an image based on, for example, a same size for all the blocks. The blocks may have, for example, 50% overlap with one of their neighboring blocks. Other amounts of overlap or no overlap may also be employed, and the blocks may be defined with different sizes depending on the application.

Figure 4:
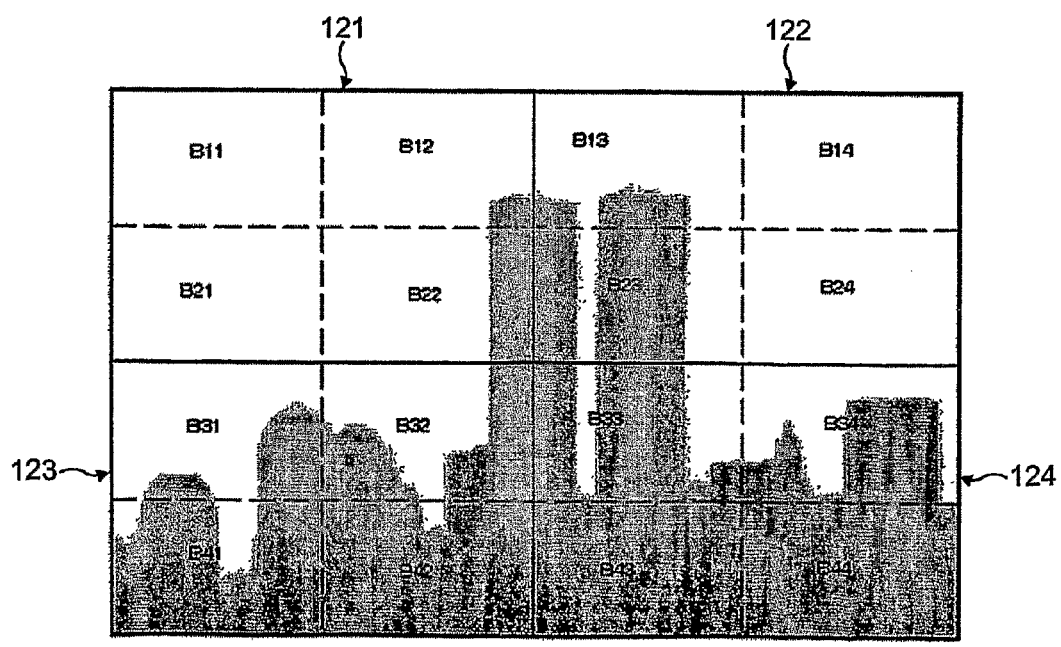
FIG. 4 depicts a diagram illustrating blocks defined by solid and dashed lines to indicate no-overlap and overlap blocks, respectively, in an image in accordance with an embodiment of the present invention.

In step 120 of the method of FIG. 2, no-overlap blocks are processed. For example, FIG. 4 depicts a diagram illustrating blocks defined by solid and dashed lines to indicate no-overlap and overlap blocks, respectively, in an image in accordance with an embodiment of the present invention. In FIG. 4, for illustrative purposes, blocks with solid line boundaries do not overlap with other blocks with solid line boundaries, but overlap with other adjacent blocks with broken line boundaries. The image of FIG. 4 has only four no-overlap blocks in this example. All four blocks have solid line boundaries, block 121 includes B11, B12, B21, B22; block 122 includes B13, B14, B23, B24; block 123 includes B31, B32, B41, B42; and block 124 includes B22, B34, B43, B44. In this case, the image is divided into 2 by 2 blocks without overlapping.

The data processing of the present invention includes using the displacement vectors for each block. Each vector represents a displacement between a color component edge map to the base color component edge map in horizontal and vertical directions. For a picture of m×n blocks with fixed block size, there are four sets of data. $V^{ij}_{1x}$, $V^{ij}_{1y}$, $V^{ij}_{2x}$; $V^{ij}_{2y}$. There are two displacement vectors for each block, $(V^x_{rg}, V^y_{rg})$, $(V^x_{rb}, V^y_{rb})$, where $V^x_{rg}$ is a displacement between red (cyan) and green (magenta) in x direction, and $V^y_{rg}$ is in y direction, while $V^x_{rb}$ and $V^y_{rb}$ are between red and blue (yellow). In the example above it is assumed that the red component is used for the base. An affine or other transform is employed to move the images such that the QC can determine if an improvement is achieved.

Figure 5:
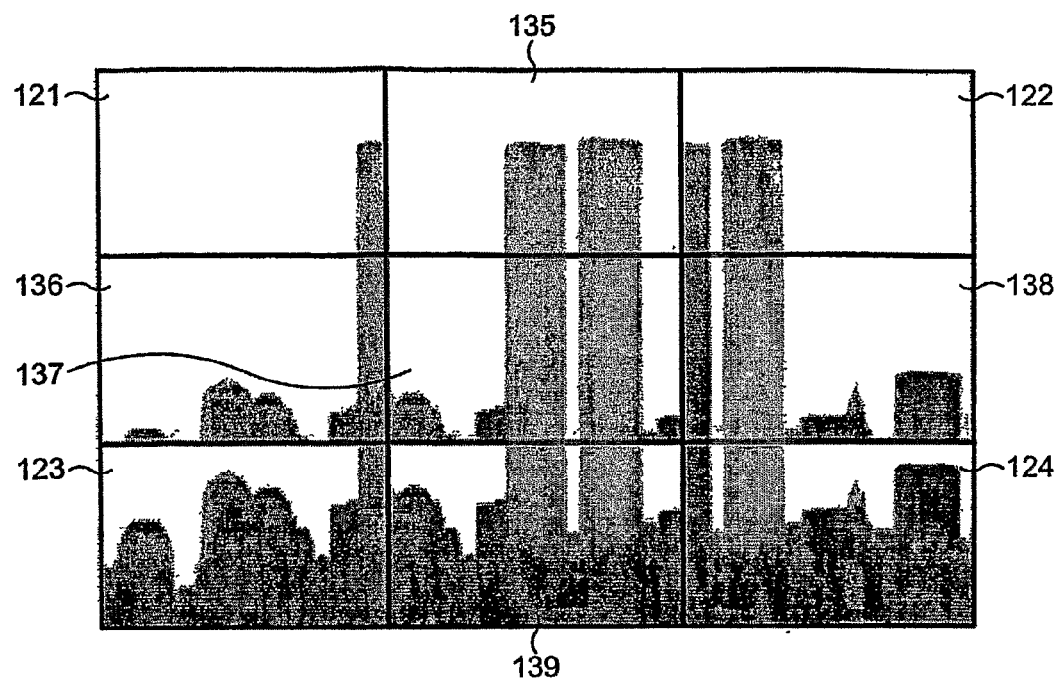
FIG. 5 depicts a diagram illustrating nine overlap blocks of FIG. 4 in accordance with an embodiment of the present invention.

Referring back to the method of FIG. 2, in step 130, overlap blocks are processed. Blocks are considered overlapping if the blocks overlap on at least one boundary. For example, FIG. 5 depicts a diagram illustrating nine overlap blocks of FIG. 4 in accordance with an embodiment of the present invention. There are a total 9 overlapping blocks in this example. Besides previous no-overlapping blocks, the following overlapping blocks include (with reference to FIGS. 4 and 5):

Block 135: B12, B13, B22, B23
Block 136: B21, B22, B31, B32
Block 137: B22, B23, B32, B33
Block 138: B23, B24, B33, B34
Block 139: B32, B33, B42, B43

These overlapping blocks are redundant; however, including them in the analysis will improve accuracy.

Figure 6:
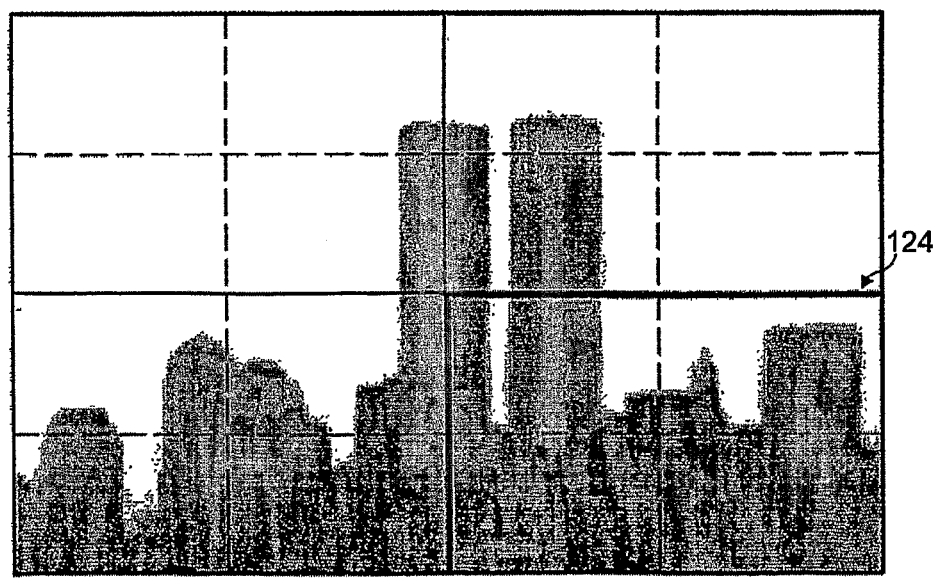
FIG. 6 depicts a diagram illustrating a slightly misregistered block to be modified in accordance with an embodiment of the present invention.

In step 140 of the method of FIG. 2, the image is recombined to quality check alignment. For example, FIG. 6 depicts a diagram illustrating a slightly misregistered block to be modified in accordance with an embodiment of the present invention. That is, FIG. 6 includes a recombined image. In FIG. 6, one block 124 does not align well for the three colors.

In step 150 of the method of FIG. 2, the quality checker makes modifications to the misregistered block. That is, the QC 16 (FIG. 1) has several options, which can include, for example: Increasing a search range for the block, changing block size, making an overlap block, manually moving the block (e.g., move two of the components relative to the base color component). The QC 16 can move the block interactively. After the block is moved, the pixels in the adjacent blocks and this block are re-interpolated. This process can be applied to, for example, Cyan, or Yellow, or both components. When a block is highlighted, the block can be moved/modified manually, or it can be moved/modified automatically (described in step 155 below). In one embodiment of the present invention, if a block is moved manually, the block is displayed after each movement. If the QC 16 is satisfied with the alignment, a command is sent to re-register the image in step 180.

In step 155, if the block is moved/modified automatically, a set of positions are displayed in step 160, and the QC 16 can choose the best position. In various embodiments of the present invention, another set of positions that are close to the previously chosen position are displayed, and the QC 16 chooses the best position of the newly provided positions. This process can continue until the QC 16 makes a final block selection.

In accordance with embodiments of the present invention, at least two options exist to display blocks. A first option is to display the image, and the other is to display the edges. These options can be selected in accordance with the present invention by the QC 16 in step 170. The selected display can be employed to perform the method steps of the method of FIG. 2. For example, a picture can be divided into blocks first and then implement edge detection, or edges are detected first and then divide the edge picture into blocks. In the present invention, any existing edge detector can be used, such as Canny edge detector. In one embodiment of the present invention, all of the edges are preferably a single pixel thick. The edge matching of the present invention can include a search window, which is opened on the base color edge picture. For each position in the search window, a non-base color edge block is compared with the base color. The number of unmatched edge points is calculated, and the smallest number is picked as the best match (best matched vector). Alternatively, the number of matched edge points is calculated and the largest number is picked as the best match. The determined best match can be tested to avoid errors. After any or all modifications or moves, the image can be reregistered in step 180.

Figure 7:
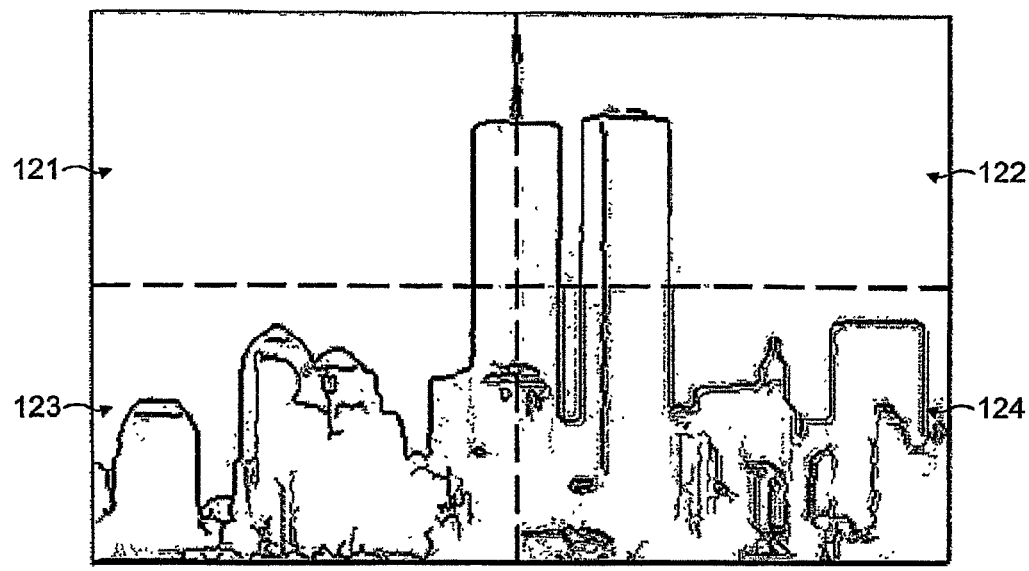
FIG. 7 depicts a diagram illustrating the misaligned block of FIG. 6 to be modified in accordance with an embodiment of the present invention.
Figure 8:
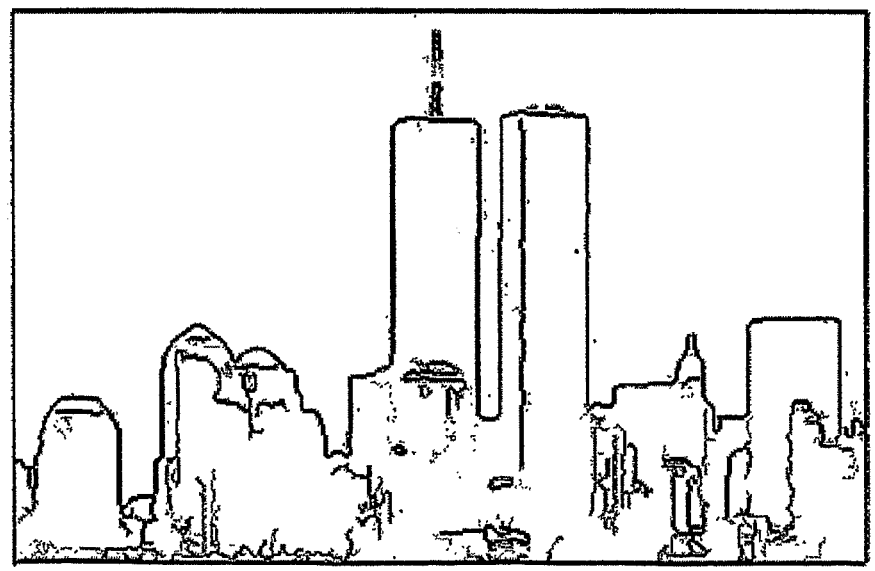
FIG. 8 depicts a diagram illustrating the misaligned block of FIG. 7 having been aligned in accordance with an embodiment of the present invention.
Figure 9:
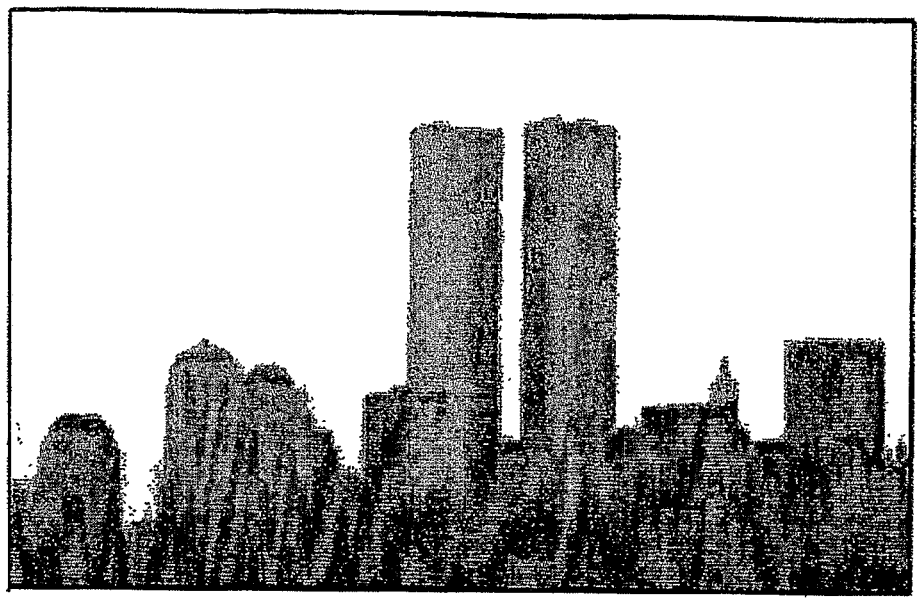
FIG. 9 depicts a diagram illustrating the realigned image of FIG. 8 reregistered in accordance with an embodiment of the present invention.

FIG. 7 depicts a diagram illustrating the misaligned block 124 of FIG. 6 to be modified in accordance with an embodiment of the present invention. In FIG. 7, the overlapping edges of the misaligned block 124 of FIG. 6 can be clearly seen. In accordance with the present invention, the QC 16 may select block 124 and move the block until better alignment is provided, or an automatic method may be employed to shift the block 124 until the QC 16 can select the best aligned image. FIG. 8 depicts a diagram illustrating the block of FIG. 7 having been aligned in accordance with an embodiment of the present invention. As depicted in FIG. 8, block 124 has been aligned as described above and no longer contains the previous misalignment of colors. FIG. 9 depicts a diagram illustrating the realigned image of FIG. 8 reregistered in accordance with an embodiment of the present invention. As depicted in FIG. 9, the previously misaligned color component images of FIG. 6 and FIG. 7 have been registered in accordance with the above described concepts of the present invention.

Figure 10:
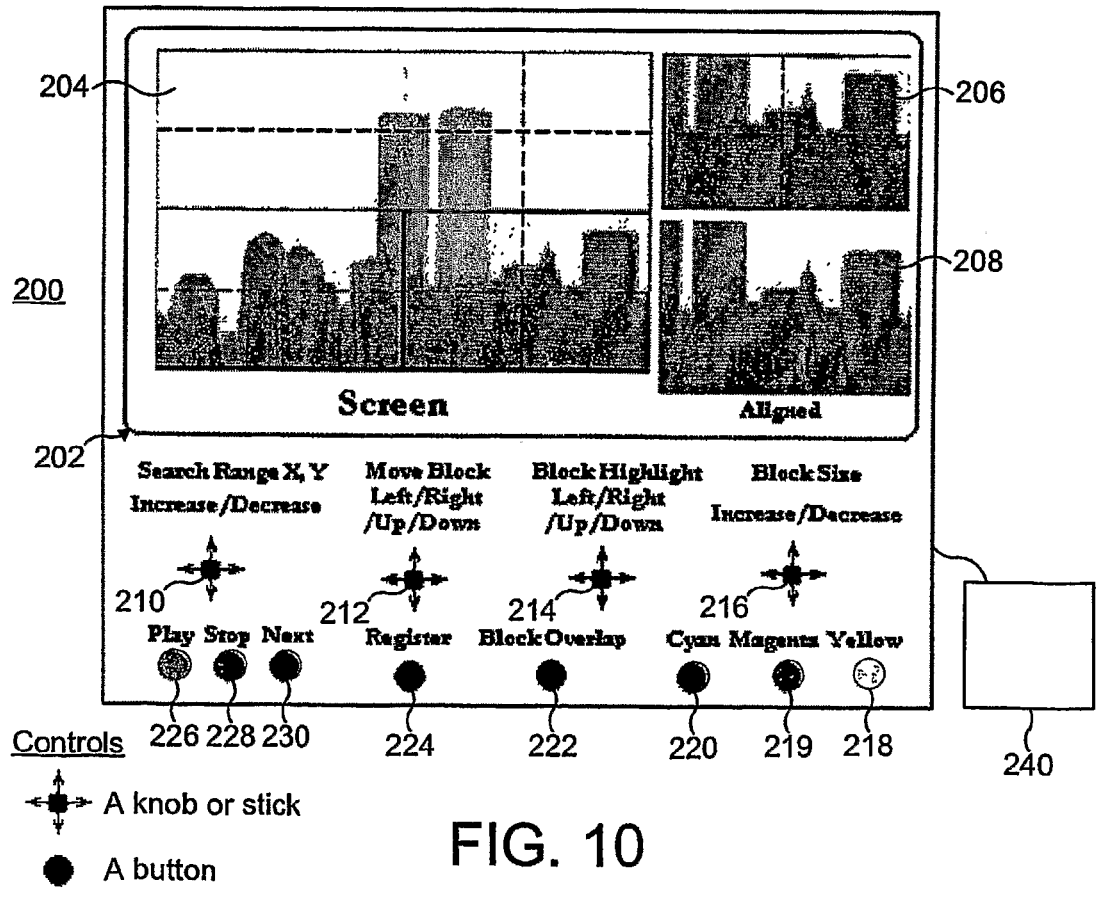
FIG. 10 depicts a quality checker control panel in accordance with an embodiment of the present invention.

FIG. 10 depicts a quality checker control panel in accordance with an embodiment of the present invention. That is, FIG. 10 depicts a graphical user interface, which permits manual or automatic registration of images and provides a reliable and repeatable method for registering color component images, such as yellow, cyan and magenta (YCM) images, to create an improved incorporated image that can be checked easily by a quality checker. The registration is preferably performed in the digital domain. The control panel 200 of FIG. 10 can be a stand alone workstation including a screen or display 202 or may be implemented in software as a graphical user interface on a computer. Controls 210-230 can include actual knobs/sticks and/or buttons or virtual knobs/sticks and/or buttons, depending on the implementation of the control panel 200. The display 202 includes a region for viewing registered images or image components to permit quality checking and modification of the images. A user controlled cursor (not shown) can be employed on screen to activate controls and to highlight or make active portion of the screen 202. The cursor may be employed and moved using a mouse, a keypad, joystick or other selection/pointing device 240, which may be maintained as part of or separate from the control panel 200.

In one embodiment of the present invention, a region 204 of the screen 202 can include a yellow color component of an image divided into blocks such that the blocks are being realigned to prevent misregistration. A preliminary rendering of the fixed image can be displayed in an alignment region 208, while region 206 can include the original image. Regions 204, 206 and 208 are described for illustrative purposes only. These regions can be employed for many other applications, which may include windows best suited for the application at hand.

For example, in region 204, a block (e.g., block 124) can be selected, and highlighted using control 212 and maneuvered using control 214. Should an inappropriate overlap or misalignment occur, the block 124 can be modified by, e.g., increasing or decreasing the search range by using a range control 210 or increasing or decreasing the block size using a size control 216. After modifying or moving the block, a re-register operation can be performed by activating a register button 224. Block overlap determination and display can be provided by activating an overlap button 222. In accordance with the present invention, color components can be shown for the image at any stage in the quality checking and modification stage by activating buttons 218, 219 and/or 220, each corresponding to a different color component.

Since control panel 200 can be employed for photographs, film, or any other digital media, multiple frames of an image can be modified and checked. A play button 226 can run film to an appropriate position where the film can be stopped using button 228. Progression to a next frame can be performed by activating button 230. It should be understood that other functions and features and fewer functions and features may be included instead of or in addition to those described and shown in FIG. 10.

It will be understood by those skilled in the art and informed by the teachings of the present invention that an image to be processed in accordance with the concepts of the present invention may include only two components and that such components may be any color components, such as R, G, B, etc. That is, the alignment process of the present invention can be applied to two components first, e.g., C and M, then two other components, e.g., Y and M next, instead of three components simultaneously. Other component combination and orders of processing can also be employed in accordance with the present invention.

Having described preferred embodiments for a system, method and graphic user interface for color component registration (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for image registration, comprising:
  dividing color components of a registered image into respective blocks, wherein at least two of said blocks of at least one of said color components overlap;

combining corresponding blocks of the color components to check alignment between the corresponding blocks of the color components;

selecting at least one block to modify to improve alignment;

providing different block positions for said selected at least one block;

selecting a block position for said selected at least one block that, out of the provided different block positions, best improves alignment; and registering the blocks.

2. The method according to claim 1, further comprising selecting between an image option and an edge option to determine a block position that best improves alignment.

3. The method according to claim 1, wherein registering includes issuing a register command from a user interface to a registration device.

4. The method according to claim 1, wherein said selected at least one block is moved to said selected block position using a user interface.

5. A system for image processing, comprising:
a registration device configured to register component images to form a registered image and to divide color components of the registered image into respective blocks, wherein at least two of said blocks of at least one of said color components overlap; and
a quality control device configured to receive a registered image, combine corresponding blocks of the color components to check alignment, select at least one block to modify to improve alignment, provide different block positions for said selected at least one block, and select a block position for said selected at least one block that, out of the provided different block positions, best improves alignment.

6. The system according to claim 5, further comprising a storage device which stores the registered image prior to being input to the quality control device.

7. The system according to claim 5, wherein the color components of the images include at least two of yellow, cyan and magenta components.

8. A non-transitory program storage device readable by machine, tangibly embodying a program of instructions executable by the machine to perform the steps of:
dividing color components of a registered image into respective blocks, wherein at least two of said blocks of at least one of said color components overlap;
combining corresponding blocks of the color components to check alignment between the corresponding blocks of the color components;
selecting at least one block to modify to improve alignment;
providing different block positions for said selected at least one block;
selecting a block position for said selected at least one block that, out of the provided different block positions, best improves alignment; and
registering the blocks.

\* \* \* \* \*